No. 633,142. Patented Sept. 19, 1899.
J. J. MONAHAN, Dec'd.
E. MONAHAN, Administratrix.
PNEUMATIC BICYCLE SADDLE.
(Application filed Apr. 28, 1897.)
(No Model.)
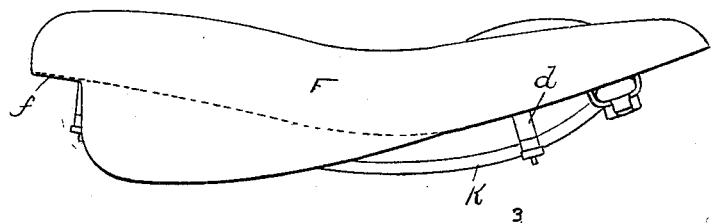
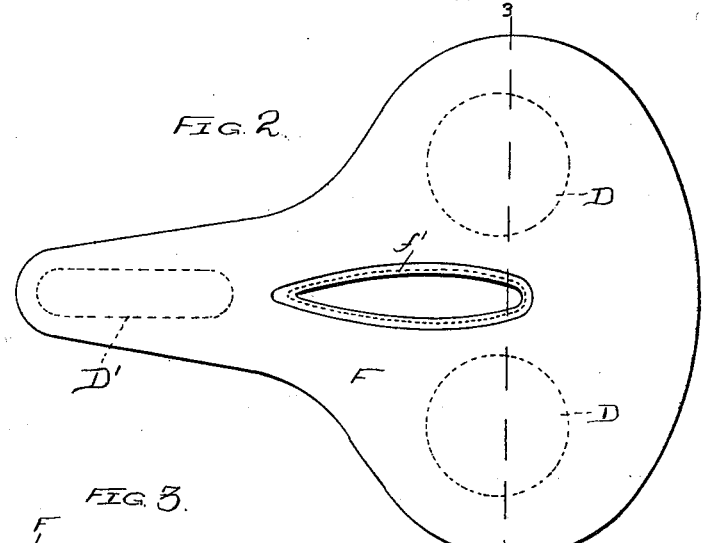
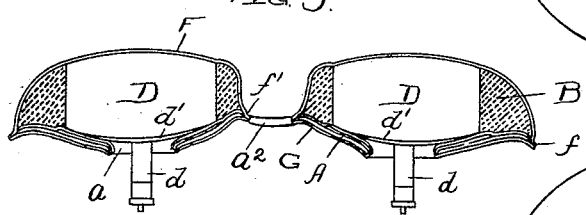
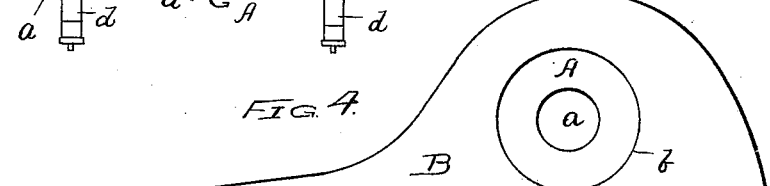
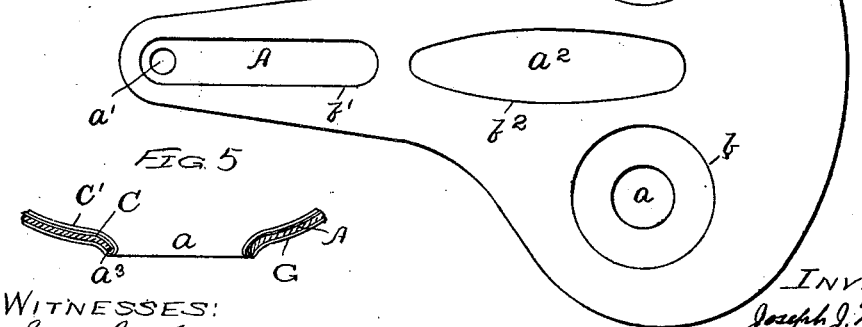
WITNESSES:
INVENTOR:
Joseph J. Monahan
BY Munday, Evarts & Adcock
HIS ATTORNEYS.

UNITED STATES PATENT OFFICE.

JOSEPH J. MONAHAN, OF CHICAGO, ILLINOIS; EMMA MONAHAN ADMINISTRATRIX OF SAID JOSEPH J. MONAHAN, DECEASED.

PNEUMATIC BICYCLE-SADDLE.

SPECIFICATION forming part of Letters Patent No. 633,142, dated September 19, 1899.

Application filed April 23, 1897. Serial No. 633,484. (No model.)

*To all whom it may concern:*

Be it known that I, JOSEPH J. MONAHAN, a citizen of the United States, residing in Chicago, in the county of Cook and State of Illinois, have invented a new and useful Improvement in Pneumatic Bicycle-Saddles, of which the following is a specification.

My invention relates to improvements in pneumatic saddles for bicycles.

In pneumatic bicycle-saddles heretofore in use great difficulty has been experienced because the proper shape of the saddle or seat is subject to variation according to the position of the rider and the amount of weight exerted upon the saddle and the degree of inflation of the pneumatic cushion, which tends to make the saddle uncomfortable and unsatisfactory, because the edges of the steel base-plate upon which the pneumatic cushions rest are liable to be from time to time exposed by the shifting of the air from one side to the other in the pneumatic cushion, because the greatest pressure of the body of the rider upon the saddle is necessarily directly at or under the pelvic bones, which thus tend to force the air away from the points of greatest pressure, where it is most needed, to other parts of the saddle where the pressure is light and where the necessity for the pneumatic cushion does not exist, because in case of accident or puncture of the pneumatic cushion the saddle becomes practicably unusable or very uncomfortable, whatever distance the rider may be from home or a repair-shop at the time the accident happens, and because, finally, the pneumatic cushions cannot be conveniently removed and repaired, it being usually necessary for this purpose to rip the seams of the leather covering of the saddle and remove the same.

The object of my invention is to overcome these difficulties and provide a pneumatic bicycle-saddle of a simple, efficient, and durable construction which will perfectly relieve the rider from all jar, shock, or vibration, in which the proper shape of the saddle or its seat may at all times be maintained uniform, in which the edges of the base-plate may be always perfectly protected from injuring the rider, in which the shape of the saddle and a comfortable seat may still exist, even after the pneumatic cushion should become punctured, injured, or deflated, and in which, finally, the pneumatic cushions or balls may be readily removed and replaced without ripping or removing the leather covering of the saddle.

In my improved saddle I combine with the base-plate, preferably of light thin sheet-steel pressed to the desired form and made of the required saddle shape, a cushion of wool felt or other suitable material and preferably about an inch in thickness and conforming in shape to the base-plate, which is placed on top of the base-plate and which serves, in connection with the base-plate and the leather covering of the saddle, to give a permanent and uniform shape to the saddle and also to afford a permanent and immovable protection at the sharp edges of the base-plate and at the portions of the seat of the saddle which come directly under the pelvic bones of the rider and at which therefore substantially all the weight comes upon the saddle, this felt or other fabric cushion is cut out or provided with circular openings, preferably about two and one-half inches in diameter, according to the size of the saddle, to receive pneumatic cushions or balls, the same being preferably of a cylindrical or disk-like form and preferably about five-eighths of an inch in depth or thickness before being inflated. The pneumatic cushions or balls are thus located directly where they are needed, are sufficiently large in size or diameter to completely protect and cushion the pelvic bones and to relieve the rider from all jar, shock, or vibration and undue or paralyzing pressure, while at the same time the elastic cushions or balls are confined in position by the surrounding cylindrical wall of the felt cushion and do not tend to vary or distort the general shape of the saddle, which is constantly maintained of the required form. The pneumatic cushions or balls are each preferably provided with a valve and valve-stem or nipple, through which they may be inflated and deflated, as required. The base-plate is provided with circular openings directly under these pneumatic cushions or balls, preferably about an inch in diameter, through which openings the pneumatic cushions when deflated may be conveniently inserted and removed without the necessity of ripping the stitches of the leather covering of the saddle or removing the same. The thickened rubber disk on the valve-stem, by which the valve-stem is secured to the pneumatic cushion or ball and which is somewhat greater in diameter than the opening in the base-plate, serves to prevent the pneumatic cushion from bagging or projecting out through the opening in the base-plate when the weight of the rider rests upon the saddle. If preferred or desired, an elongated pneumatic cushion may be provided at the horn of the saddle in like manner.

My invention further consists in the novel construction of parts and devices and in the novel combinations of parts and devices herein shown and described, and specified in the claims.

In the accompanying drawings, forming a part of this specification, Figure 1 is a side elevation of a bicycle-saddle embodying my invention. Fig. 2 is a plan view. Fig. 3 is a section on line 3 3 of Fig. 2. Fig. 4 is a detail plan view of the felt or other fabric cushion or pad and showing also the base-plate, and Fig. 5 is an enlarged detail sectional view.

In the drawings similar letters of reference indicate like parts throughout all the figures.

In said drawings, A represents the base-plate of the saddle, the same being preferably made of light thin sheet-steel stamped or pressed to the required shape, although it may be made of wood or other suitable material.

B is the pad or cushion of wool felt or other fabric, conforming in shape to and placed on top of the base-plate A.

C is a lining of cloth or other fabric which may preferably be interposed between the pad B and base-plate A.

D D are the pneumatic cushions or balls, which are placed one on each wing of the saddle at the portions of the seat thereof which come directly under the pelvic bones, the same being preferably of a disk-like or flat cylindrical form.

D' is the pneumatic cushion of an elongated form, which may be placed, if desired, lengthwise in the horn of the saddle.

F is the leather covering for the seat, and G the leather covering for the bottom of the saddle.

The base-plate A is provided with openings $a\ a$, preferably each about an inch in diameter, through which the pneumatic cushions or balls D D may be inserted and removed when deflated. The base-plate A is also provided with a circular opening $a'$, through which the elongated pneumatic cushion D' for the nose of the saddle may be inserted and removed when deflated. The base-plate A is further provided with a central elongated opening $a^2$ for the purpose of forming the customary central longitudinal depression in the saddle.

The felt or other fabric cushion or pad B is provided with two circular openings or cut-out portions $b\ b$, one in each wing of the saddle directly over the smaller openings $a\ a$ in the base-plate A, for the purpose of receiving the pneumatic cushions or balls D D. These openings should correspond in size or diameter to the diameter of the pneumatic cushions or balls D D when deflated. The wool felt or other fabric cushion or pad B is further provided with an elongated opening $b'$ at the horn or nose portion of the saddle to receive the pneumatic cushion D' and also with a central longitudinal opening $b^2$, corresponding to the central opening $a^2$ in the base-plate. The cloth or fabric lining C, which is preferably interposed between the base-plate A and the cushion or pad B, is also cut out or provided with openings similar to those in the base-plate. This fabric lining should be cemented to the base-plate, and the cushion or pad B is then cemented in place or on the fabric lining C. The purpose of the cloth or fabric lining C is to better protect the rubber pneumatic cushions D from injury or wear against the base-plate or the edges of the openings $a$ therein, and for this same purpose the edges of the base-plate surrounding the openings $a$ are countersunk or beveled downward, as is clearly indicated in the drawings at $a^3$.

The pneumatic cushions or balls D D are each preferably of disk-like or flat cylindrical form and conform in diameter to the holes or openings $b$ in the pad B. They are made of rubber and each preferably provided with a valve in a valve-stem $d$, the thickened flat disk $d'$ of which should be of larger diameter than the opening $a$ in the base-plate, so that the rim of this thickened rubber disk $d'$ will bear or take support upon the base-plate A surrounding the opening $a$, and thus prevent the rubber cushion or ball D from bagging through or projecting out at said opening $a$ in the base-plate when the rubber cushion is inflated and the weight of the rider exerted upon it. By providing the pneumatic cushion or ball D with the reinforcing-disk $d'$ on its under side the opening $a$ in the base-plate may be made sufficiently large to permit the ready and convenient removal or insertion of the pneumatic cushion when deflated, while at the same time the proper and efficient action of the pneumatic cushion when inflated in supporting the weight of the rider and cushioning his body against shocks, jars, and vibrations from the bicycle-frame is fully accomplished and in no way interfered with. This permits the rubber pneumatic cushions to be removed through the base-plate A itself for the purpose of repairing punctures and makes it entirely unnecessary to rip the seams of the leather covering F G or remove the same for the purpose of repairing the pneumatic cushions or replacing them with new ones and adds very greatly to the practicability and utility of pneumatic bicycle-saddles. At the same time the pneumatic cushions D D are located at the precise portions of the saddle-seat where they are needed to produce comfort and prevent injurious shock, jar, and vibration being communicated to the rider from the bicycle-frame, and the rubber pneumatic cushions or balls are of such shape and so surrounded and confined by the felt pad or cushion B that no disagreeable rolling or displacing action of the pneumatic cushions or of the air therein can possibly take place however the rider may from time to time shift his seat or position on the saddle, and as the pneumatic cushions D D are combined with the surrounding and confining felt pad or cushion B and only extend over those comparatively small parts of the saddle-seat where a pneumatic-cushion effect is really required it will be obvious that the felt or fabric pad or cushion B will serve to cause the saddle-seat to permanently maintain its proper and required shape or form, and, moreover, in case the pneumatic cushions D D should become punctured or broken or deflated the saddle will still retain its usual shape and be a comfortable saddle for continued use, as the openings $b\ b$ in the felt pad B are not large enough to interfere with the comfort of the saddle and are of course spanned by the leather seat-cover F.

The pneumatic cushion D' in the nose or horn of the saddle is of an elongated form and adapted to be inserted and removed when deflated through the opening $a'$ in the base-plate. This pneumatic cushion D' may be used, if desired, although it is not really much needed, as little weight ordinarily can come upon the nose or horn of the saddle. It is provided with a valve-stem $d$ the same as the pneumatic cushions D D.

The leather seat-covering F is secured by a marginal seam $f$ to the leather bottom covering G and also by an internal marginal seam $f'$, as indicated in the drawings. The bottom seat-covering G has holes through the same corresponding to the holes $a\ a'$ in the base-plate A. As the felt or fabric pad or cushion B comes out to the edge of the base-plate A and as the whole is securely inclosed by the leather covering F G, it will be seen that the shape of the saddle at the sharp edges of the base-plate is in no way dependent upon the pneumatic cushions, but is on the contrary entirely independent thereof and consequently is not subject to change or variation. The edges of the base-plate are thus at all times securely protected by the felt or fabric pad B and the leather covering F G. The rider is therefore in no danger of injury or discomfort from the edges of the base-plate. The felt pad B is securely cemented to the base-plate or to the interposed lining C, and this cementing also serves to better maintain the normal and permanent shape of the saddle. If desired, supplemental leather washers or linings C' may surround the openings $a$ in the base-plate as an additional protection to the rubber pneumatic cushions D D.

K K are the customary spring-rods of the saddle, the same being secured at front and rear to the base-plate.

The pad B, having the openings $b\ b$ to receive the pneumatic cushions D D, is preferably made of ordinary wool felt about one inch in thickness; but it may be formed of hair or any other suitable slightly soft and partially elastic material adapted to serve both as a cushion to protect the rider from direct contact with the metal base-plate and at the same time to laterally surround and confine the pneumatic cushions D D and preserve the saddle as a whole in proper shape, as hereinbefore explained; and by the use of the terms "partially soft and elastic pad" in the claims I mean to include generically a pad or cushion of wool felt or any other suitable material which will in my new combination perform the double function above set forth.

I claim—

1. In a bicycle-saddle, the combination with a base of partially soft and elastic pad resting on said base and provided with cut-out portions or openings to receive pneumatic cushions or balls at the portions of the saddle-seat which come under the pelvic bones of the rider, and pneumatic cushions or balls resting on the base and surrounded and confined on all sides laterally by the walls of said openings in said partially soft and elastic pad, substantially as specified.

2. A bicycle-saddle provided with a pneumatic cushion and partially soft and elastic pad surrounding and supporting said pneumatic cushion, substantially as specified.

3. The combination with a saddle-base of partially soft and elastic pad conforming in shape to and resting upon said base, and pneumatic cushions seated in openings in said felt pad or cushion and a leather covering inclosing the same; whereby the shape of the saddle is maintained or preserved independently of the pneumatic cushions and the sharp edges of the saddle-base permanently protected, substantially as specified.

4. A pneumatic bicycle-saddle having a base provided with an opening through which the pneumatic cushion may be removed or replaced, whereby the necessity for ripping the sewed seams of the leather covering is obviated, in combination with a pneumatic cushion having a flexible reinforcing-disk spanning said opening in the base to prevent the pneumatic cushion bagging out through the same, the saddle-base itself surrounding said opening serving to support the pneumatic cushion when inflated, substantially as specified.

JOSEPH J. MONAHAN.

Witnesses:
  EDMUND ADCOCK,
  H. M. MUNDAY.